B. T. BABBITT.
AXLES FOR RAILWAY-CARS.

No. 194,399. Patented Aug. 21, 1877.

Witnesses
John Becker
Fred Hayne

Inventor
B. T. Babbitt
by his Attorneys
Brown & Allen

UNITED STATES PATENT OFFICE.

BENJAMIN T. BABBITT, OF NEW YORK, N. Y.

IMPROVEMENT IN AXLES FOR RAILWAY-CARS.

Specification forming part of Letters Patent No. 194,399, dated August 21, 1877; application filed May 2, 1877.

*To all whom it may concern:*

Be it known that I, BENJAMIN T. BABBITT, of the city and State of New York, have invented an Improvement in Compound Axles for Railway-Cars and other Vehicles; and I do hereby declare that the following is a full, clear, and exact description of the same, reference being had to the accompanying drawing, forming part of this specification.

My invention has for its object to facilitate the passing of curves by wheels rigidly attached to their axles, and the axles of which consequently turn with the attached wheels.

It is well known that, when two wheels of equal diameter are rigidly attached to an axle consisting of a single rigid bar, one or other of said wheels must slip or slide upon the track whenever said wheels pass a curve, unless special provision is made to prevent said slipping by raising the level of one side of the track and giving the wheels a conical tread, in such manner that the said wheels run on treads of different diameters while passing such curve. It is evident that the raising of the level of the outside rail and the conical tread of the wheels can only prevent sliding when the curves on a road are all similar, and the tread of the wheels are given the proper conoid form to correspond with the curves and the speed of running when passing such curves—conditions which cannot be fulfilled in practice. Hence, although the ordinary practice reduces the evil of sliding in passing curves, it still remains an evil, which can only be surmounted by a compound axle, the sections of which rotate independently, or by wheels permitted to turn on their axles.

Such a sectional compound axle is supplied by my improvement, which is cheaper, more durable, and more practical in its character than other compound axles heretofore known in the art.

My invention consists in the combination, with the two sections forming parts of a compound axle, of a flanged box attached to one section of the axle and a flange attached to the other section, (the flange on one section of the axle running in the flanged box on the other section,) an annular cap, and bolts for retaining the flange on one section of the axle in the flanged box on the other section, and for retaining the said sections of the axle in proper relation with each other.

Figure 1:
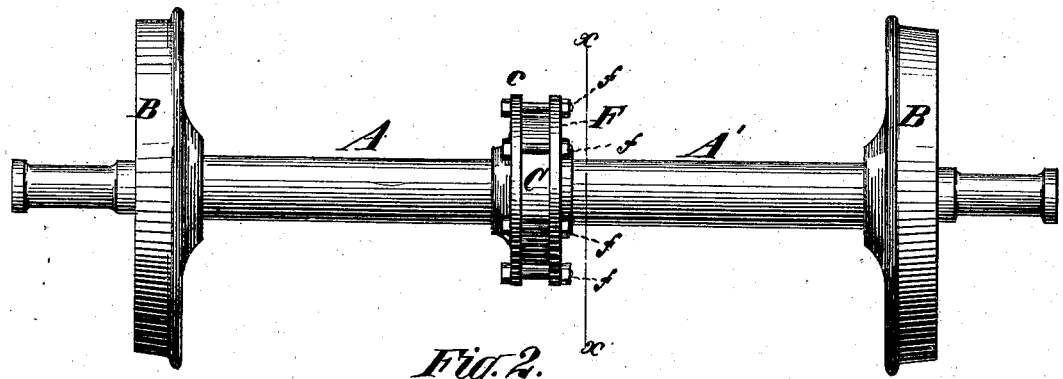
Figure 2:
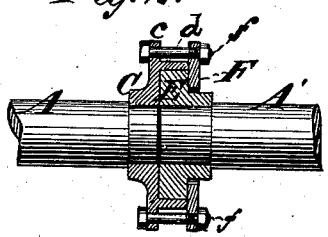
Figure 3:
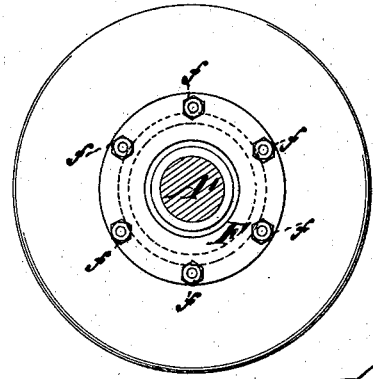

Figure 1 in the drawing represents a side view of a compound axle constructed in accordance with my invention. Fig. 2 is a partial side view of such an axle, and a vertical central section through the aforesaid flanged box, flange, and annular cap. Fig. 3 is a vertical section on the line *x x* in Fig. 1.

A A' are sections of the compound axle, to which the wheels B are attached. On the inner end of the section A is shrunk, keyed, or otherwise attached, the cylindrical box C, having formed around its outer border the flange or rim *c*, the sides of the box being formed by a flange, *d*, extending from the face of the disk, which is attached to the shaft, and forming part of the same.

Accurately, but not too snugly, fitted in the box C is a flange, E, Fig. 2, shrunk, keyed, or forged on the end of the section A' of said compound axle.

The annular cap F is fitted to rest snugly against the open side of the box C, and when applied to said box it closes the same and forms a lateral bearing for the outside of the flange E.

Said annular cap has the same external diameter as that of the flange *c* on the box C, and in both said flange *c* and the said cap F are drilled, near the outer border of each, holes for the reception of the screw-bolts *f*, which, when the parts are put together, hold the sections A A' in true rectilinear relation, and firmly attach the same together, while permitting the said sections to rotate independently of each other.

By filling with paraffine the slight space in the box C surrounding the flange E, the device will be sufficiently lubricated to endure all the wear that can come upon it for a very long period.

I claim—

The combination, with the independently-rotating axle-sections A A', of the box C, provided with the flanges *c d*, the flange E, fitted into the box, the annular cap F, and the bolts *f*, all constructed and arranged substantially as shown.

B. T. BABBITT.

Witnesses:
L. E. BABBITT,
DAVID J. NEWLAND.